United States Patent
Hapsari et al.

(10) Patent No.: US 8,744,369 B2
(45) Date of Patent: Jun. 3, 2014

(54) MOBILE COMMUNICATION METHOD, SUBSCRIBER MANAGEMENT SERVER, AND MOBILITY MANAGEMENT NODE

(75) Inventors: Wuri Andarmawanti Hapsari, Tokyo (JP); Hideaki Takahashi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/990,494

(22) PCT Filed: Nov. 17, 2011

(86) PCT No.: PCT/JP2011/076550
§ 371 (c)(1),
(2), (4) Date: Aug. 14, 2013

(87) PCT Pub. No.: WO2012/073716
PCT Pub. Date: Jun. 7, 2012

(65) Prior Publication Data
US 2013/0316656 A1 Nov. 28, 2013

(30) Foreign Application Priority Data
Nov. 30, 2010 (JP) ................ P2010-267205

(51) Int. Cl.
*H04B 17/00* (2006.01)
(52) U.S. Cl.
USPC ...................... 455/67.11; 455/423
(58) Field of Classification Search
USPC ............. 455/456.1, 423, 456.5, 436, 67.1
See application file for complete search history.

(56) References Cited

U.S. PATENT DOCUMENTS

2007/0161379 A1* 7/2007 Morisaki .................. 455/456.1
2010/0267378 A1* 10/2010 Hamabe et al. ............. 455/423
2013/0095860 A1* 4/2013 Hapsari et al. ........... 455/456.5

FOREIGN PATENT DOCUMENTS

JP          2008-022065 A        1/2008
WO        2009/107953 A2       9/2009

OTHER PUBLICATIONS

International Search Report issued in PCT/JP2011/076550 mailed on Dec. 27, 2011 (2 pages).
3GPP TS 37.320 V1.0.0; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Aug. 2010 (15 pages).
Official Action issued in counterpart Korean Patent application No. 10-2013-7014527 dated Sep. 9, 2013 (7 pages).
Nokia Siemens Networks, Nokia Corporation; "MDT configuration parameters"; 3GPP TSG-RAN WG2 Meeting #71, R2-104904; Madrid, Spain; Aug. 23-Aug. 27, 2010 (4 pages).
NTT Docomo, Inc.; "On UE selection and MDT policy configuration"; 3GPP TSG-RAN2#69bis, R2-102439; Beijing, China; Apr. 12-Apr. 16, 2010 (5 pages).

* cited by examiner

*Primary Examiner* — April G Gonzales
(74) *Attorney, Agent, or Firm* — Osha Liang LLP

(57) ABSTRACT

A mobile communication method according to the present invention includes a step A of transmitting, by an operation and maintenance server EM, "MDT config" to a subscriber management server HSS, and a step B of instructing, by the subscriber management server HSS, the target mobile station UE to perform the MDT measurement process through a mobility management node MME and a radio base station eNB when it is determined that the MDT measurement process by the target mobile station UE is approved.

8 Claims, 7 Drawing Sheets

MOBILE COMMUNICATION METHOD, SUBSCRIBER MANAGEMENT SERVER, AND MOBILITY MANAGEMENT NODE

TECHNICAL FIELD

The present invention relates to a mobile communication method, a subscriber management server, and a mobility management node.

BACKGROUND ART

In an LTE (Long Term Evolution) scheme, "MDT (Minimisation of Drive Tests)" is defined.

The MDT includes two modes of "Immediate MDT" and "Logged MDT".

In the "Immediate MDT", a target mobile station UE is configured to perform a measurement process based on "RRC Measurement Configuration" for current RRM (Radio Resource Management), to add "Location Information" indicating location information of the target mobile station UE to "RRC Measurement Report" including a result of the measurement process, and to report the "RRC Measurement Report" to a network.

Meanwhile, in the "Logged MDT", the target mobile station UE is configured to receive "Logged MDT Configuration" in a connection state (RRC_CONNECTED), to perform a measurement process based on the "Logged MDT Configuration" in an idle state (RRC_IDLE), to store a result of the measurement process as a MDT log, and to report the MDT log when the target mobile station UE is transitioned to the connection state (RRC_CONNECTED).

As a procedure for starting the MDT, a "Signaling based MDT activation procedure" is defined.

In the "Signaling based MDT activation procedure", for example, the target mobile station UE is configured to be designated by IMSI (International Mobile Subscriber Identity) or IMEI-SV (International Mobile Equipment Identity Software Version). In addition, a target MDT area may be designated.

CITATION LIST

Non Patent Literature

[NPL 1] 3GPP 37.320, Universal Terrestrial Radio Access (UTRA) and Evolved Universal Terrestrial Radio Access (E-UTRA); Radio measurement collection for Minimization of Drive Tests (MDT); Overall description; Stage 2

However, since the MDT is not a service for a particular subscriber of a mobile station UE, in order to allow the mobile station UE to perform a MDT measurement process, approval of the subscriber of the mobile station UE is considered to be required.

Furthermore, in the current state, an operation and maintenance server EM or a radio base station eNB does not understand whether the MDT measurement process for the target mobile station UE is approved.

SUMMARY OF INVENTION

Therefore, the present invention has been achieved in view of the above-described problems, and an object thereof is to provide a mobile communication method, a subscriber management server, and a mobility management node, by which it is possible to start MDT only when a MDT measurement process for the target mobile station UE is approved.

A first characteristic of the present embodiment is summarized in that a mobile communication method, in which a target mobile station designated by an operation and maintenance server performs a measurement process designated by the operation and maintenance server and reports a result of the measurement process, includes: a step A of transmitting, by the operation and maintenance server, instruction information instructing the target mobile station to perform the measurement process to a subscriber management server; and a step B of designating, by the subscriber management server, the target mobile station to perform the measurement process through a mobility management node and a radio base station when it is determined that the measurement process by the target mobile station has been approved.

A second characteristic of the present embodiment is summarized in that a mobile communication method, in which a target mobile station designated by an operation and maintenance server performs a measurement process designated by the operation and maintenance server and reports a result of the measurement process, includes: a step A of transmitting, by the operation and maintenance server, instruction information instructing the target mobile station to perform the measurement process to a subscriber management server; a step B of transmitting, by the subscriber management server, the instruction information to the mobility management node; and a step C of designating, by the mobility management node, the target mobile station to perform the measurement process through a radio base station when it is determined that the measurement process by the target mobile station has been approved.

A third characteristic of the present embodiment is summarized in that a subscriber management server, which is used in a mobile communication system in which a target mobile station designated by an operation and maintenance server is able to perform a measurement process designated by the operation and maintenance server and report a result of the measurement process, includes: a determination unit that determines whether the measurement process by the target mobile station has been approved when instruction information instructing the target mobile station to perform the measurement process is received from the operation and maintenance server; and an instruction unit that instructs the target mobile station to perform the measurement process through a mobility management node and a radio base station when it is determined that the measurement process by the target mobile station has been approved.

A fourth characteristic of the present embodiment is summarized in that a mobility management node, which is used in a mobile communication system in which a target mobile station designated by an operation and maintenance server is able to perform a measurement process designated by the operation and maintenance server and to report a result of the measurement process, includes: a determination unit that determines whether the measurement process by the target mobile station has been approved when instruction information instructing the target mobile station to perform the measurement process is received; and an instruction unit that instructs the target mobile station to perform the measurement process through a radio base station when it is determined that the measurement process by the target mobile station has been approved.

As described above, according to the present invention, it is possible to provide a mobile communication method, a subscriber management server, and a mobility management node, with which it is possible to start MDT only when a MDT measurement process by the target mobile station UE is approved.

DESCRIPTION OF EMBODIMENTS

Mobile Communication System According to First Embodiment of the Present Invention With reference to FIG. 1 through FIG. 4, a mobile communication system according to a first embodiment of the present invention will be described.

Figure 1:
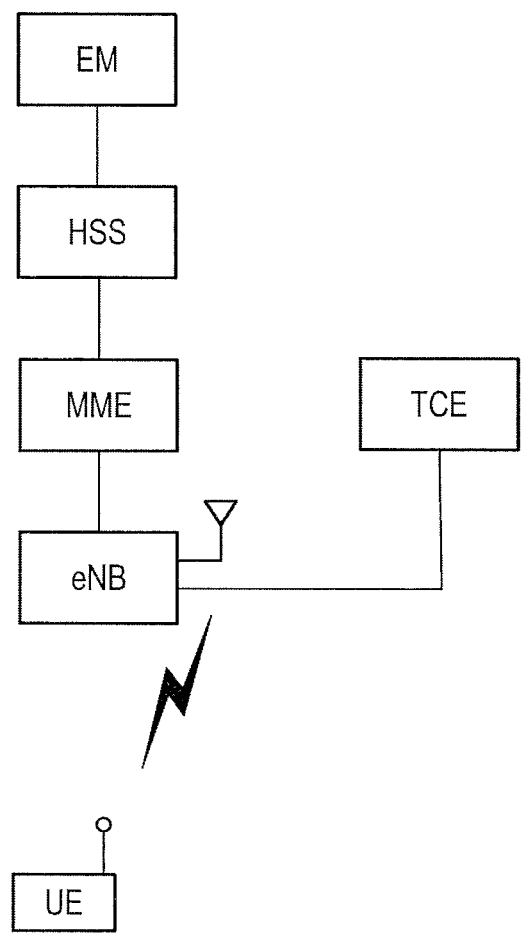
FIG. 1 is a diagram illustrating the entire configuration of a mobile communication system according to a first embodiment of the present invention.

As illustrated in FIG. 1, the mobile communication system according to the present embodiment is an LTE mobile communication system, and includes an operation and maintenance server EM, a subscriber management server HSS (Home Subscriber Server), a mobility management node MME (Mobility Management Entity), a trace collection server TCE (Trace Collection Entity), and a radio base station eNB.

In the mobile communication system according to the present embodiment, a target mobile station UE designated by the operation and maintenance server EM is configured to perform a MDT measurement process designated by the operation and maintenance server EM, and to report a MDT log including a result of the MDT measurement process.

The target mobile station UE according to the present embodiment is able to cope with "Immediate MDT" and "Logged MDT".

Furthermore, in the mobile communication system according to the present embodiment, as a procedure for starting MDT, "Signaling based MDT activation procedure" is applied.

Figure 2:
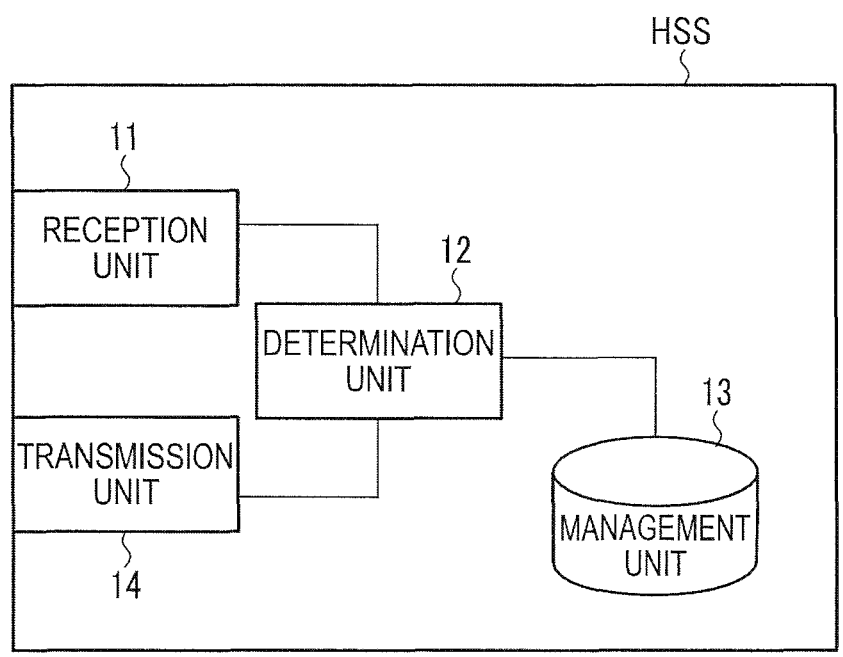
FIG. 2 is a functional block diagram of a subscriber management server according to the first embodiment of the present invention.

As illustrated in FIG. 2, the subscriber management server HSS includes a reception unit 11, a determination unit 12, a management unit 13, and a transmission unit 14.

The reception unit 11 is configured to receive "Trace Session Activation" including "MDT config" from the operation and maintenance server EM as instruction information instructing the target mobile station UE to perform the MDT measurement process.

The management unit 13 is configured to manage subscriber information of each mobile station UE. For example, the management unit 13 is configured to manage approval information indicating whether the MDT measurement process by each mobile station UE is approved.

For example, the approval information may be set when a user of each mobile station UE applies a subscription contract.

When the "Trace Session Activation" including the "MDT config" is received by the reception unit 11, the determination unit 12 is configured to determine whether the MDT measurement process by the target mobile station UE designated by the "MDT config" is approved, with reference to the management unit 13.

The transmission unit 14 is configured to transmit the "Trace Session Activation" for instructing the target mobile station UE to perform the MDT measurement process to the mobility management node MME, and to transmit "Trace Session Activation Reject" for rejecting the implementation of the MDT measurement process by the target mobile station UE, to the operation and maintenance server EM.

Specifically, when the determination unit 12 determines that the MDT measurement process by the target mobile station UE is approved, the transmission unit 14 is configured to transmit the "Trace Session Activation" including the "MDT config" to the mobility management node MME.

Meanwhile, when the determination unit 12 determines that the MDT measurement process by the target mobile station UE is not approved, the transmission unit 14 is configured to transmit the "Trace Session Activation Reject" including the "MDT config" to the operation and maintenance server EM.

Hereinafter, with reference to FIG. 3 and FIG. 4, an example of the operations of the mobile communication system according to the present embodiment will be described.

Figure 3:
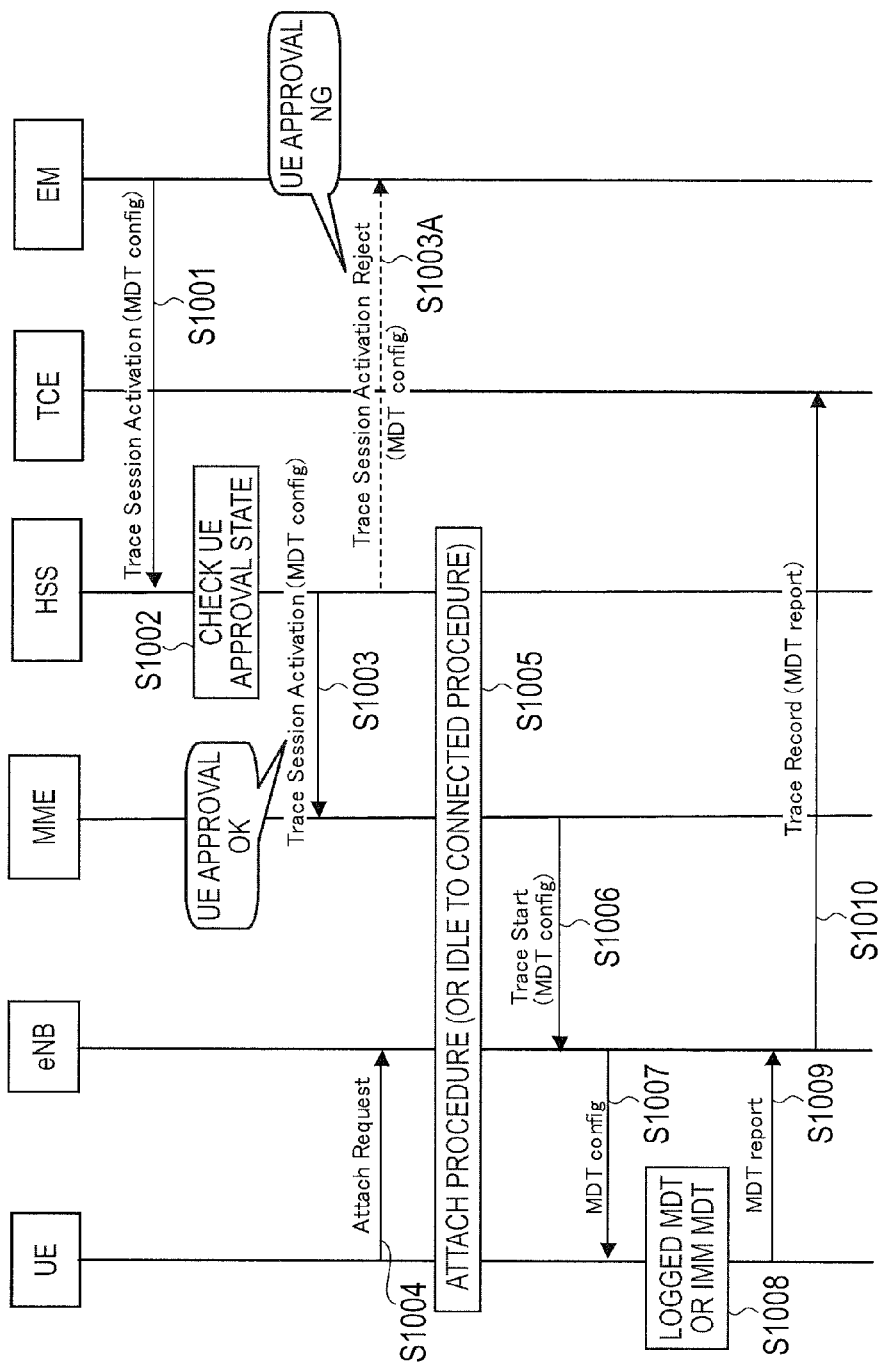
FIG. 3 is a sequence diagram illustrating the operations of the mobile communication system according to the first embodiment of the present invention.

Firstly, with reference to FIG. 3, a description will be provided for an operation before the mobile station UE enters a connection state (RRC_CONNECTED) in the mobile communication system according to the present embodiment.

As illustrated in FIG. 3, in step S1001, the operation and maintenance server EM transmits the "Trace Session Activation" including the "MDT config" to the subscriber management server HSS.

In step S1002, the subscriber management server HSS determines whether the MDT measurement process by the target mobile station UE designated by the "MDT config" is approved.

Furthermore, when the subscriber management server HSS determines that the MDT measurement process by the target mobile station UE is not approved, the subscriber management server HSS transmits the "Trace Session Activation Reject" including the "MDT config" to the operation and maintenance server EM in step S1003A.

Meanwhile, when the subscriber management server HSS determines that the MDT measurement process by the target mobile station UE is approved, the subscriber management server HSS transmits the "Trace Session Activation" including the "MDT config" to the mobility management node MME in step S1003.

Furthermore, since the target mobile station UE did not enter the connection state, the mobility management node MME holds the "Trace Session Activation".

The target mobile station UE transmits "Attach Request" to the radio base station eNB in step S1004, and an attach process (Attach Procedure) is performed in step S1005. Alternatively, a transition process of the target mobile station UE from an idle state (RRC_IDLE) to a connection state (RRC_CONNECTED) is performed.

In step S1006, the mobility management node MME transmits "Trace Start" including the "MDT config" to the radio base station eNB.

In step S1007, the radio base station eNB notifies the target mobile station UE of the "MDT config" through an RRC message.

The target mobile station UE performs the MDT measurement process in one mode of the "Immediate MDT" and the "Logged MDT" in step S1008, and transmits "MDT report" including a result of the MDT measurement process to the radio base station eNB in step S1009. Furthermore, the target mobile station UE transmits "Location Information" together with the "MDT report".

In step S1010, the radio base station eNB transmits the information received from the target mobile station UE in step S1009 and "Trace Record" including the "MDT config" to the trace collection server TCE.

Figure 4:
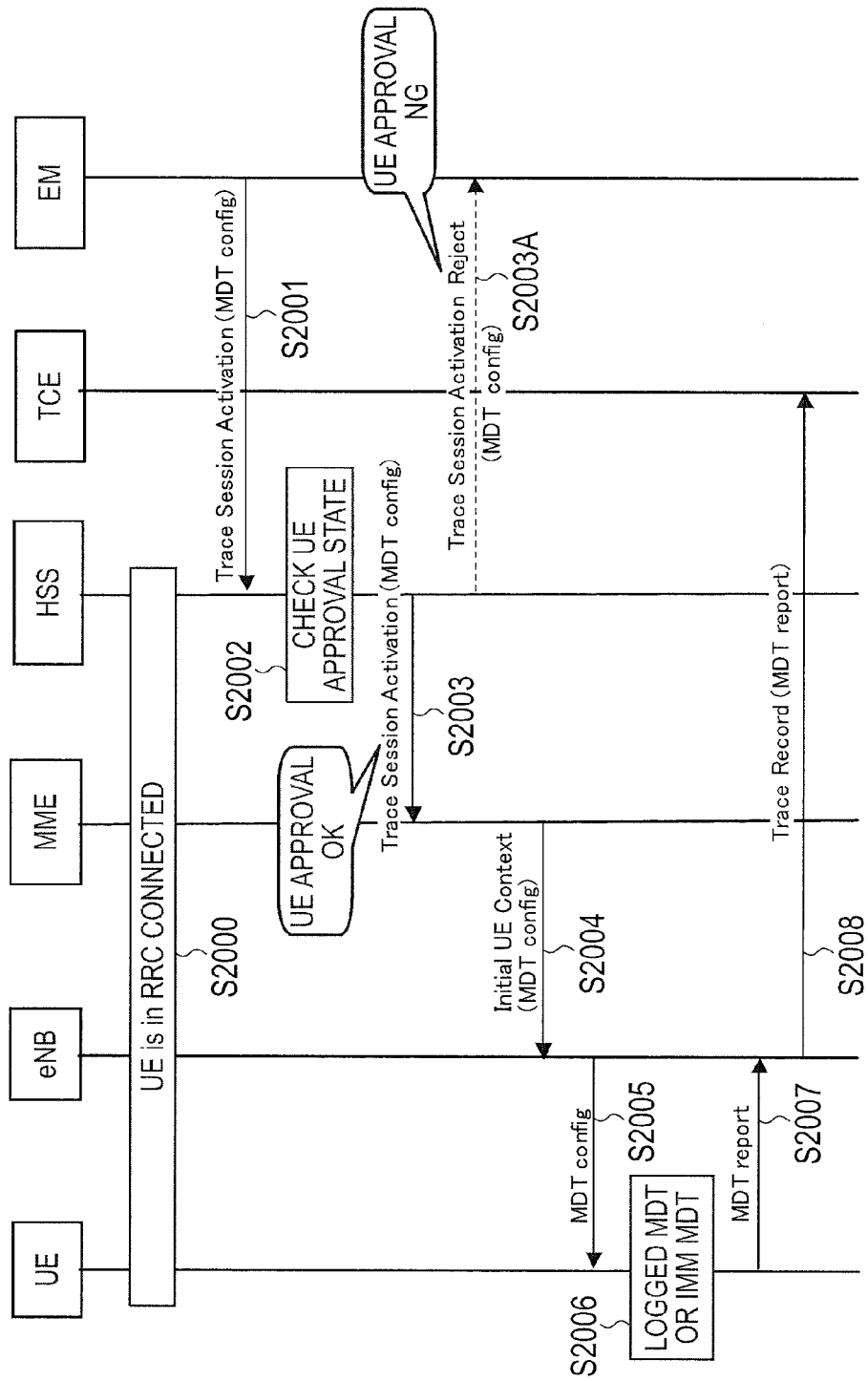
FIG. 4 is a sequence diagram illustrating operations of the mobile communication system according to the first embodiment of the present invention.

Secondly, with reference to FIG. 4, a description will be provided for an operation after the mobile station UE entered the connection state (RRC_CONNECTED) in the mobile communication system according to the present embodiment.

As illustrated in FIG. 4, in step S2001, the operation and maintenance server EM transmits the "Trace Session Activation" including the "MDT config" to the subscriber management server HSS.

In step S2002, the subscriber management server HSS determines whether the MDT measurement process by the target mobile station UE designated by the "MDT config" is approved.

Furthermore, when the subscriber management server HSS determines that the MDT measurement process by the target mobile station UE is not approved, the subscriber management server HSS transmits the "Trace Session Activation Reject" including the "MDT config" to the operation and maintenance server EM in step S2003A.

Meanwhile, when the subscriber management server HSS determines that the MDT measurement process by the target mobile station UE is approved, the subscriber management server HSS transmits the "Trace Session Activation" including the "MDT config" to the mobility management node MME in step S2003.

Furthermore, since the target mobile station UE entered the connection state, the mobility management node MME transmits the "Trace Start" including the "MDT config" to the radio base station eNB in step S2004.

Operations of steps S2005 to S2008 are equal to those of the steps S1007 to S1010 illustrated in FIG. 3.

In accordance with the mobile communication system according to the first embodiment of the present invention, only when the subscriber management server HSS determines that the MDT measurement process by the target mobile station UE is approved, it is possible to start the MDT by the target mobile station UE.

(First Modification)

Hereinafter, with reference to FIG. 5 through FIG. 7, a mobile communication system according to a first modification of the present invention is explained while focusing on the difference from the aforementioned mobile communication system according to the first embodiment.

Figure 5:
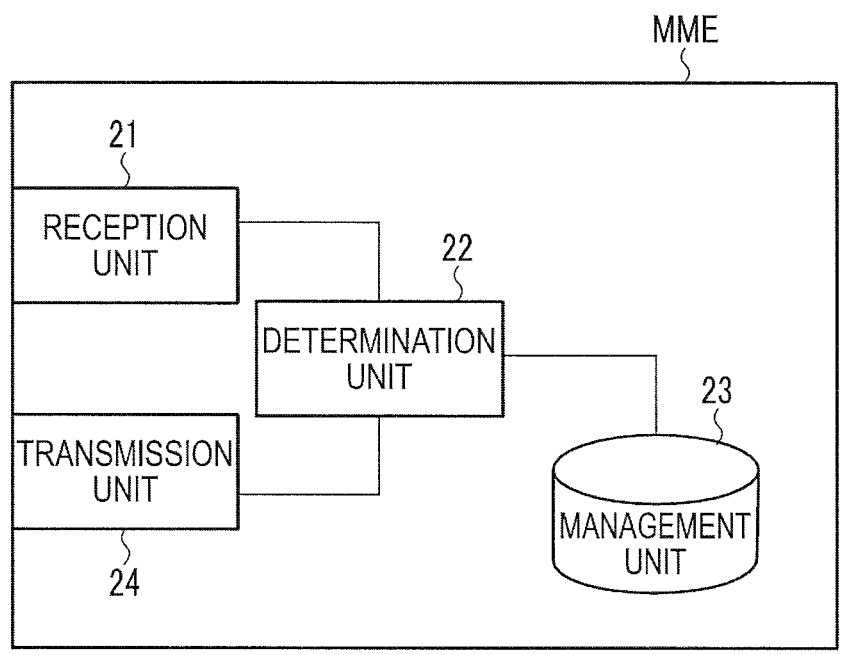
FIG. 5 is a functional block diagram of a mobility management node according to a first modification of the present invention.

As illustrated in FIG. 5, the mobility management node MME includes a reception unit 21, a determination unit 22, a management unit 23, and a transmission unit 24.

The reception unit 21 is configured to receive the "Trace Session Activation" including the "MDT config" from the subscriber management server HSS as the instruction information instructing the target mobile station UE to perform the MDT measurement process.

The management unit 23 is configured to manage subscriber information of the mobile station UE. For example, the management unit 13 is configured to manage approval information indicating whether the MDT measurement process by each mobile station UE is approved.

When the "Trace Session Activation" including the "MDT config" is received by the reception unit 21, the determination unit 22 is configured to determine whether the MDT measurement process by the target mobile station UE designated by the "MDT config" is approved, with reference to the management unit 23.

The transmission unit 24 is configured to transmit the "Trace Start" for instructing the target mobile station UE to perform the MDT measurement process to the radio base station eNB, and to transmit "Trace Session Activation Reject" for rejecting the implementation of the MDT measurement process by the target mobile station UE, to the subscriber management server HSS.

Specifically, when the determination unit 22 determines that the MDT measurement process by the target mobile station UE is approved, the transmission unit 24 is configured to transmit the "Trace Start" including the "MDT config" to the radio base station eNB.

Meanwhile, when the determination unit 22 determines that the MDT measurement process by the target mobile station UE is not approved, the transmission unit 14 is configured to transmit the "Trace Session Activation Reject" including the "MDT config" to the subscriber management server HSS.

Hereinafter, with reference to FIG. 6 and FIG. 7, an example of the operations of the mobile communication system according to the present first modification will be described.

Figure 6:
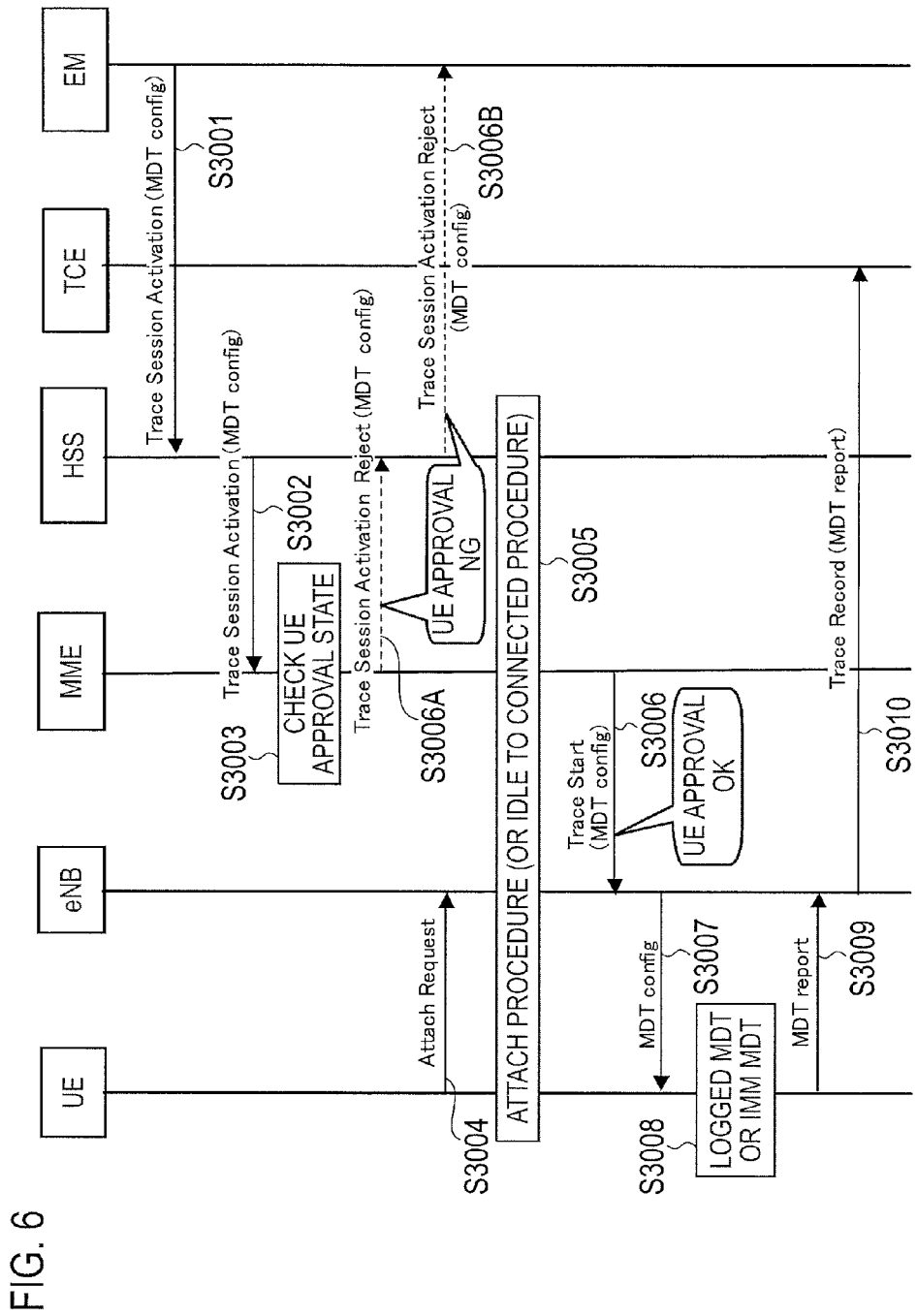
FIG. 6 is a sequence diagram of operations of a mobile communication system according to the first modification of the present invention.

Firstly, with reference to FIG. 6, a description will be provided for an operation before the mobile station UE enters a connection state (RRC_CONNECTED) in the mobile communication system according to the present first modification.

As illustrated in FIG. 6, in step S3001, the operation and maintenance server EM transmits the "Trace Session Activation" including the "MDT config" to the subscriber management server HSS.

In step S3002, the subscriber management server HSS transmits the "Trace Session Activation" including the "MDT config" to the mobility management node MME.

In step S3003, the mobility management node MME determines whether the MDT measurement process by the target mobile station UE designated by the "MDT config" is approved.

Furthermore, when the mobility management node MME determines that the MDT measurement process by the target mobile station UE is not approved, the subscriber management server HSS transmits the "Trace Session Activation Reject" including the "MDT config" to the subscriber management server HSS in step S3006A, and the subscriber management server HSS transmits the "Trace Session Activation Reject" including the "MDT config" to the operation and maintenance server EM in step S3006B.

Meanwhile, when the mobility management node MME determines that the MDT measurement process by the target mobile station UE is approved, since the target mobile station UE did not enter the connection state, the mobility management node MME holds the "Trace Session Activation".

The target mobile station UE transmits the "Attach Request" to the radio base station eNB in step S3004, and an attach process (Attach Procedure) is performed in step S3005. Alternatively, a transition process of the target mobile station UE from an idle state (RRC_IDLE) to a connection state (RRC_CONNECTED) is performed.

In step S3006, the mobility management node MME transmits the "Trace Start" including the "MDT config".

Operations of steps S3007 to S3010 are equal to those of the steps S1007 to S1010 illustrated in FIG. 3.

Figure 7:
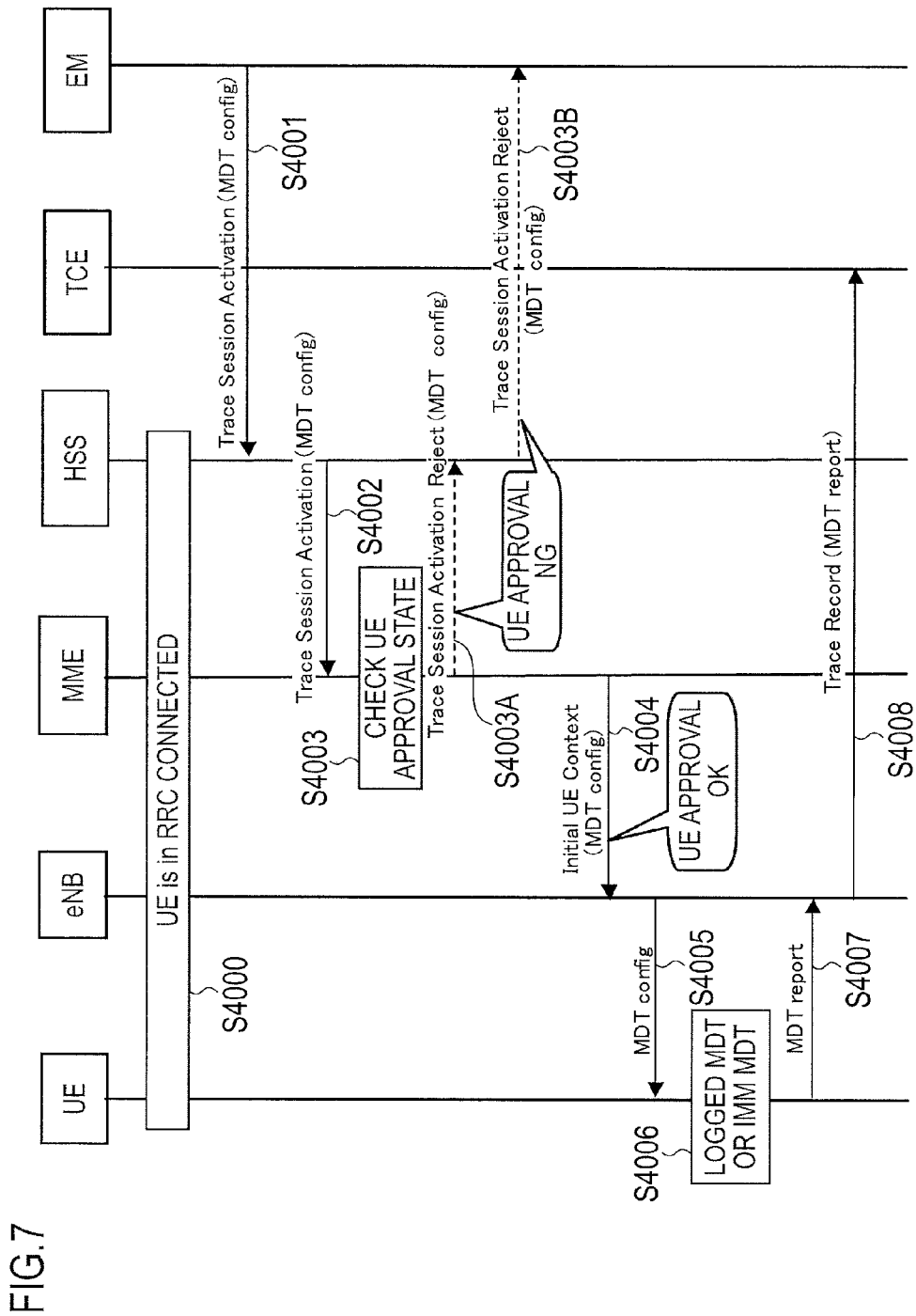
FIG. 7 is a sequence diagram of the operations of the mobile communication system according to the first modification of the present invention.

Secondly, with reference to FIG. 7, a description will be provided for an operation after the mobile station UE entered the connection state (RRC_CONNECTED) in the mobile communication system according to the present first modification.

As illustrated in FIG. 7, in step S4001, the operation and maintenance server EM transmits the "Trace Session Activation" including the "MDT config" to the subscriber management server HSS.

In step S4002, the subscriber management server HSS transmits the "Trace Session Activation" including the "MDT config" to the mobility management node MME.

In step S4003, the mobility management node MME determines whether the MDT measurement process by the target mobile station UE designated by the "MDT config" is approved.

Furthermore, when the mobility management node MME determines that the MDT measurement process by the target mobile station UE is not approved, the mobility management node MME transmits the "Trace Session Activation Reject" including the "MDT config" to the subscriber management server HSS in step S4004A, and the subscriber management server HSS transmits the "Trace Session Activation Reject" including the "MDT config" to the operation and maintenance server EM in step S4004B.

Meanwhile, when the mobility management node MME determines that the MDT measurement process by the target mobile station UE is approved, since the target mobile station UE entered the connection state, the mobility management node MME transmits the "Trace Start" including the "MDT config" to the radio base station eNB in step S4004.

Operations of steps S4005 to S4008 are equal to those of the steps S1007 to S1010 illustrated in FIG. 3.

In accordance with the mobile communication system according to the present first modification, only when the mobility management node MME determines that the MDT measurement process by the target mobile station UE is approved, it is possible to start the MDT by the target mobile station UE.

The characteristics of the present embodiment as described above may be expressed as follows.

A first characteristic of the present embodiment is summarized in that a mobile communication method, in which a target mobile station UE designated by an operation and maintenance server EM performs a MDT measurement process designated by the operation and maintenance server EM and reports a MDT log including a result of the MDT measurement process, includes: a step A of transmitting, by the operation and maintenance server EM, "MDT config (instruction information instructing the target mobile station UE to perform the MDT measurement process)" to a subscriber management server HSS; and a step B of instructing, by the subscriber management server HSS, the target mobile station UE to perform the MDT measurement process through a mobility management node MME and a radio base station eNB when it is determined that the MDT measurement process by the target mobile station UE is approved.

In the first characteristic of the present embodiment, in the step B, after the target mobile station UE performs an attach process (Attach Procedure) or is transitioned to a connection state (RRC_CONNECTED), the subscriber management server HSS may instruct the target mobile station UE to perform the MDT measurement process.

A second characteristic of the present embodiment is summarized in that a mobile communication method, in which a target mobile station UE designated by an operation and maintenance server EM performs a MDT measurement process designated by the operation and maintenance server EM and reports a MDT log including a result of the MDT measurement process, includes: a step A of transmitting, by the operation and maintenance server EM, "MDT config" to a subscriber management server HSS; a step B of transmitting, by the subscriber management server HSS, the "MDT config" to a mobility management node MME; and a step C of instructing, by the mobility management node MME, the target mobile station UE to perform the MDT measurement process through a radio base station eNB when it is determined that the MDT measurement process by the target mobile station UE is approved.

In the second characteristic of the present embodiment, in the step C, after the target mobile station UE performs an attach process or is transitioned to a connection state, the mobility management node MME may instruct the target mobile station UE to perform the MDT measurement process.

A third characteristic of the present embodiment is summarized in that a subscriber management server HSS, which is used in a mobile communication system in which a target mobile station UE designated by an operation and maintenance server EM is able to perform a MDT measurement process designated by the operation and maintenance server EM and to report a MDT log including a result of the MDT measurement process, includes: a determination unit 12 that determines whether the MDT measurement process by the target mobile station UE is approved when "MDT config" is received from the operation and maintenance server EM; and a transmission unit 14 that instructs the target mobile station UE to perform the MDT measurement process through a mobility management node MME and a radio base station eNB when it is determined that the MDT measurement process by the target mobile station UE is approved.

In the third characteristic of the present embodiment, after the target mobile station UE performs an attach process or is transitioned to a connection state, the transmission unit 13 may be configured to instruct the target mobile station UE to perform the MDT measurement process.

A fourth characteristic of the present embodiment is summarized in that a mobility management node MME, which is used in a mobile communication system in which a target mobile station UE designated by an operation and maintenance server EM is able to perform a MDT measurement process designated by the operation and maintenance server EM and to report a MDT log including a result of the MDT measurement process, includes: a determination unit 22 that determines whether the MDT measurement process by the target mobile station UE is approved when "MDT config" is received; and a transmission unit 23 that instructs the target mobile station UE to perform the MDT measurement process through a radio base station eNB when it is determined that the MDT measurement process by the target mobile station UE is approved.

In the fourth characteristic of the present embodiment, after the target mobile station UE performs an attach process or is transitioned to a connection state, the transmission unit 23 may be configured to instruct the target mobile station UE to perform the MDT measurement process.

In addition, the operation of the above-mentioned operation and maintenance server EM, subscriber management server HSS, trace collection server TCE, mobility management node MME, radio base station eNB or mobile station UE may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. Such an ASIC may be arranged in the operation and maintenance server EM, the subscriber management server HSS, the trace collection server TCE, the mobility management node MME, the radio base station eNB, or the mobile station UE. As a discrete component, such storage medium and processor may be arranged in the operation and maintenance server EM, the subscriber management server HSS, the mobility management node MME, the trace collection server TCE, the radio base station eNB, or the mobile station UE.

Thus, the present invention has been explained in detail by using the above-mentioned embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

HSS . . . Subscriber management server
MME . . . Mobile management node
11, 21 . . . Reception unit
12, 22 . . . Determination unit
13, 23 . . . Management unit
14, 24 . . . Transmission unit

The invention claimed is:

1. A mobile communication method, in which a target mobile station designated by an operation and maintenance server performs a measurement process designated by the operation and maintenance server and reports a result of the measurement process, the method comprising:
   a step A of transmitting, by the operation and maintenance server, instruction information instructing the target mobile station to perform the measurement process to a subscriber management server; and
   a step B of instructing, by the subscriber management server, through a mobility management node and a radio base station, the target mobile station to perform the measurement process when it is determined that the measurement process by the target mobile station has been approved.

2. The mobile communication method according to claim 1, wherein in the step B, after the target mobile station performs an attach process or is transitioned to a connection state, the subscriber management server instructs the target mobile station to perform the measurement process.

3. A mobile communication method, in which a target mobile station designated by an operation and maintenance server performs a measurement process designated by the operation and maintenance server and reports a result of the measurement process, the method comprising:
   a step A of transmitting, by the operation and maintenance server, instruction information instructing the target mobile station to perform the measurement process to a subscriber management server; and
   a step B of transmitting, by the subscriber management server, the instruction information to a mobility management node; and
   a step C of instructing, by the mobility management node, through a radio base station, the target mobile station to perform the measurement process when it is determined that the measurement process by the target mobile station has been approved.

4. The mobile communication method according to claim 3, wherein in the step C, after the target mobile station performs an attach process or is transitioned to a connection state, the mobility management node instructs the target mobile station to perform the measurement process.

5. A subscriber management server, which is used in a mobile communication system in which a target mobile station designated by an operation and maintenance server is able to perform a measurement process designated by the operation and maintenance server and to report a result of the measurement process, the server comprising:
   a determination unit that determines whether the measurement process by the target mobile station has been approved when instruction information instructing the target mobile station to perform the measurement process is received from the operation and maintenance server; and
   an instruction unit that instructs the target mobile station through a mobility management node and a radio base station to perform the measurement process when it is determined that the measurement process by the target mobile station has been approved.

6. The subscriber management server according to claim 5, wherein after the target mobile station performs an attach process or is transitioned to a connection state, the instruction unit instructs the target mobile station to perform the measurement process.

7. A mobility management node, which is used in a mobile communication system in which a target mobile station designated by an operation and maintenance server is able to perform a measurement process designated by the operation and maintenance server and to report a result of the measurement process, comprising:
   a determination unit that determines whether the measurement process by the target mobile station has been approved when instruction information instructing the target mobile station to perform the measurement process is received; and
   an instruction unit that instructs the target mobile station through a radio base station to perform the measurement process when it is determined that the measurement process by the target mobile station has been approved.

8. The mobility management node according to claim 7, wherein after the target mobile station performs an attach process or is transitioned to a connection state, the instruction unit instructs the target mobile station to perform the measurement process.

* * * * *